United States Patent [19]

Reyman

[11] Patent Number: 5,363,991
[45] Date of Patent: Nov. 15, 1994

[54] DEVICE FOR THE CONTROLLED MEASURING AND DISPENSING OF A FLUID

[76] Inventor: Mark E. Reyman, 246 Centre Ave., Apt. 5N, New Rochelle, N.Y. 10805

[21] Appl. No.: 147,145

[22] Filed: Nov. 2, 1993

Related U.S. Application Data

[60] Division of Ser. No. 991,140, Dec. 16, 1992, Pat. No. 5,259,140, which is a continuation-in-part of Ser. No. 821,798, Jan. 16, 1992, Pat. No. 5,174,478, which is a division of Ser. No. 640,527, Jan. 10, 1991, Pat. No. 5,119,971, which is a continuation of Ser. No. 410,157, Sep. 20, 1989, abandoned, which is a continuation-in-part of Ser. No. 117,356, Oct. 27, 1987, abandoned, which is a continuation-in-part of Ser. No. 821,781, Feb. 7, 1986, abandoned.

[51] Int. Cl.$^5$ .............................................. B65D 37/00
[52] U.S. Cl. ................................. 222/207; 222/211; 222/438; 222/454; 222/567
[58] Field of Search ............... 222/207, 209, 211, 212, 222/215, 434, 438, 439, 454, 455, 456, 566, 567

[56] References Cited

U.S. PATENT DOCUMENTS

| | | | |
|---|---|---|---|
| 1,972,152 | 9/1934 | López | 222/439 |
| 2,091,629 | 8/1937 | Kappenberg | 222/455 |
| 2,105,957 | 1/1938 | Severson | 222/209 X |
| 2,428,233 | 9/1947 | Livadas | 222/455 |
| 2,583,821 | 1/1952 | DuBois | 239/327 |
| 2,599,446 | 6/1952 | Greene | 222/207 X |
| 2,728,491 | 12/1955 | Aneshansley | 222/207 X |
| 2,730,270 | 1/1956 | Heinemann | 222/207 X |
| 2,744,663 | 5/1956 | White | 222/207 |
| 2,760,692 | 8/1956 | Buehlig | 222/434 |
| 2,783,919 | 3/1957 | Ansell | 222/211 |
| 2,859,900 | 11/1958 | Kiyuna | 222/434 X |
| 2,989,215 | 6/1961 | Willingham | 222/207 |
| 3,006,506 | 10/1961 | Germano | 222/439 X |
| 3,010,614 | 11/1961 | Udy | 222/212 X |
| 3,029,001 | 4/1962 | Blish | 222/207 |
| 3,089,623 | 5/1963 | Padzieski | 222/207 X |
| 3,138,299 | 6/1964 | Staunton | 222/211 X |
| 3,190,505 | 6/1965 | Arbitman et al. | 222/207 |
| 3,246,807 | 4/1966 | Micallef | 222/207 |
| 3,249,267 | 5/1966 | Carrion, Jr. et al. | 222/567 X |
| 3,369,713 | 2/1968 | Godschalk, Jr. | 222/207 X |
| 4,077,547 | 3/1978 | Donoghue | 222/207 |
| 4,143,794 | 3/1979 | Stratford et al. | 222/207 X |
| 4,157,768 | 6/1979 | Britt | 222/205 X |
| 4,437,587 | 3/1984 | Duering | 222/207 |
| 4,474,312 | 10/1984 | Donoghue | 222/207 X |
| 4,564,129 | 1/1986 | Urban | 222/207 |
| 4,747,521 | 5/1988 | Saffron | 222/207 X |
| 4,828,149 | 5/1989 | Hester | 222/207 |
| 5,174,478 | 12/1992 | Reyman | 222/207 |

FOREIGN PATENT DOCUMENTS

| | | |
|---|---|---|
| 280820 | 4/1970 | Austria . |
| 522629 | 11/1956 | Belgium . |
| 0117423 | 9/1984 | European Pat. Off. . |
| 0335505 | 10/1989 | European Pat. Off. . |
| 774149 | 11/1934 | France . |
| 2802210 | 7/1979 | Germany . |
| 749407 | 5/1956 | United Kingdom . |
| 1218344 | 1/1971 | United Kingdom . |
| 1559542 | 1/1980 | United Kingdom . |
| 1219473 | 3/1986 | U.S.S.R. . |

Primary Examiner—Kevin P. Shaver
Attorney, Agent, or Firm—Morgan & Finnegan

[57] ABSTRACT

A device is provided for controlled dispensing of a measured quantity of fluid from a flexible container, The device has a chamber adapted to hold a measured quantity of fluid when the container is inverted and righted. This fluid is then dispensed from the chamber through a conduit in direct response to a force exerted on the flexible wall of the container. One embodiment of the device is particularly suited to safeguard against contamination of the device. This embodiment features a dispensable nozzle ejectable by the user upon administration of the fluid, as well as a valve system to prevent airborne contaminants from entering the device and fluid reservoir. A further embodiment includes an inlet tube having a plurality of measuring notches communicating with a measuring chamber affixed to the side of the device. The inlet tube may be rotated to seal the chamber against spillage of the fluid. An additional embodiment features a floating housing floor slidingly mated within a housing. By rotating the housing chamber, the axial height of he housing floor can be varied within the housing to alter the size of the measuring chamber.

8 Claims, 11 Drawing Sheets

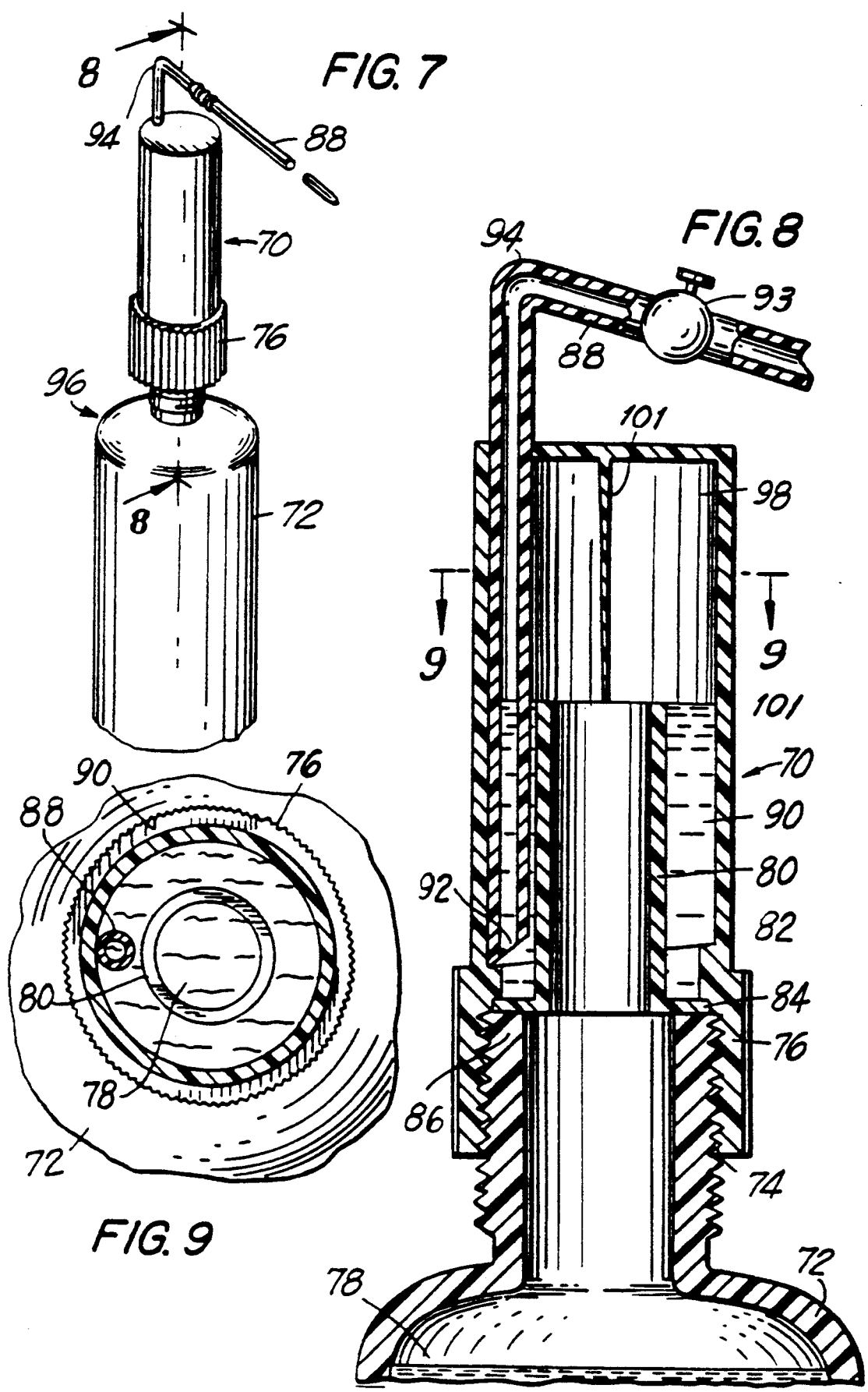

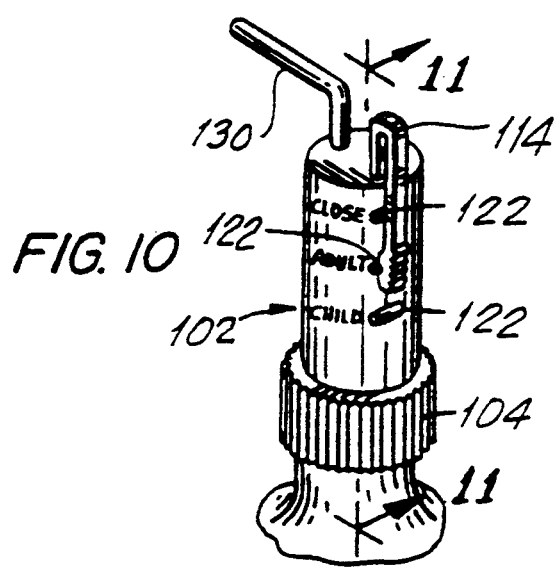
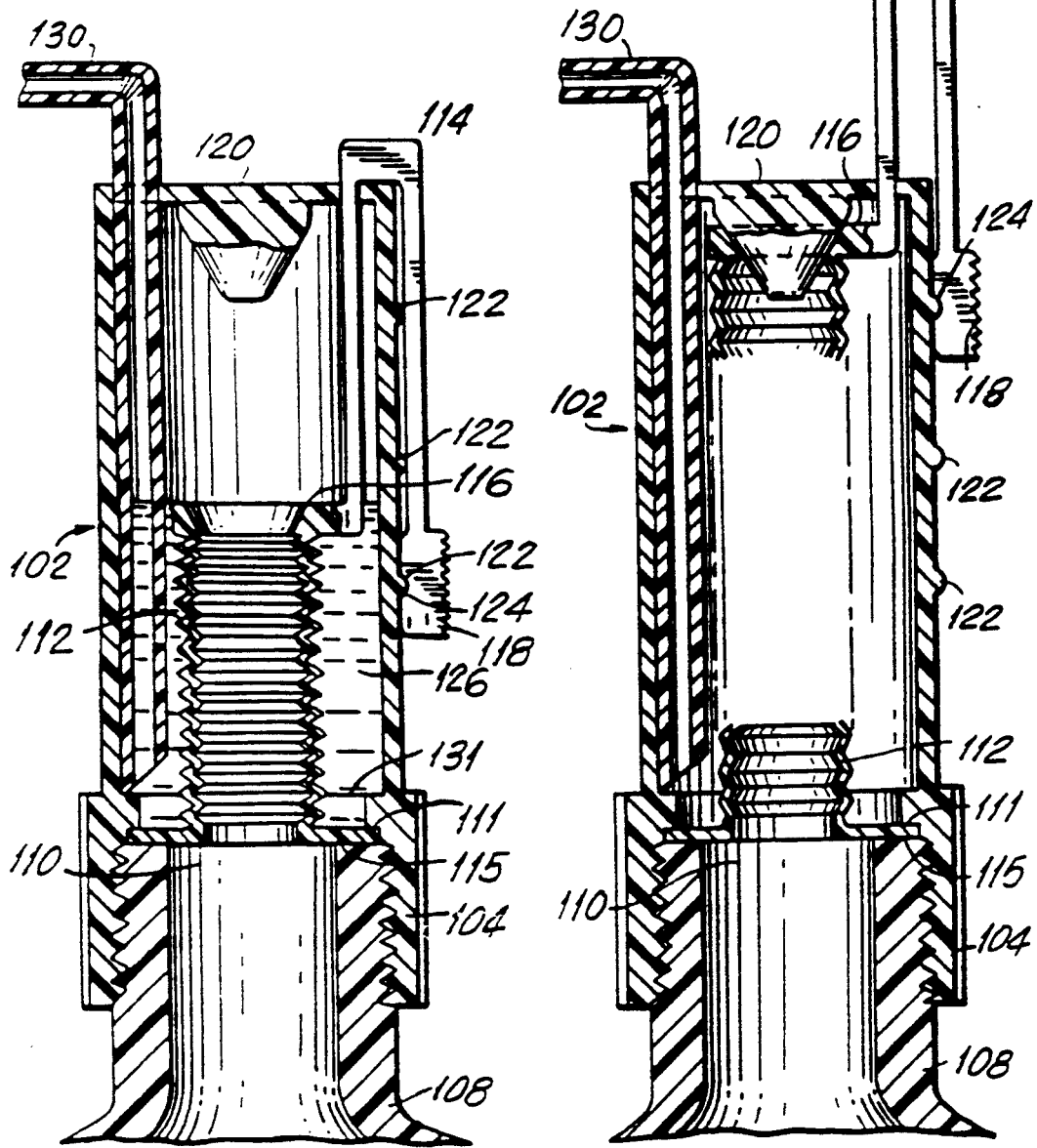

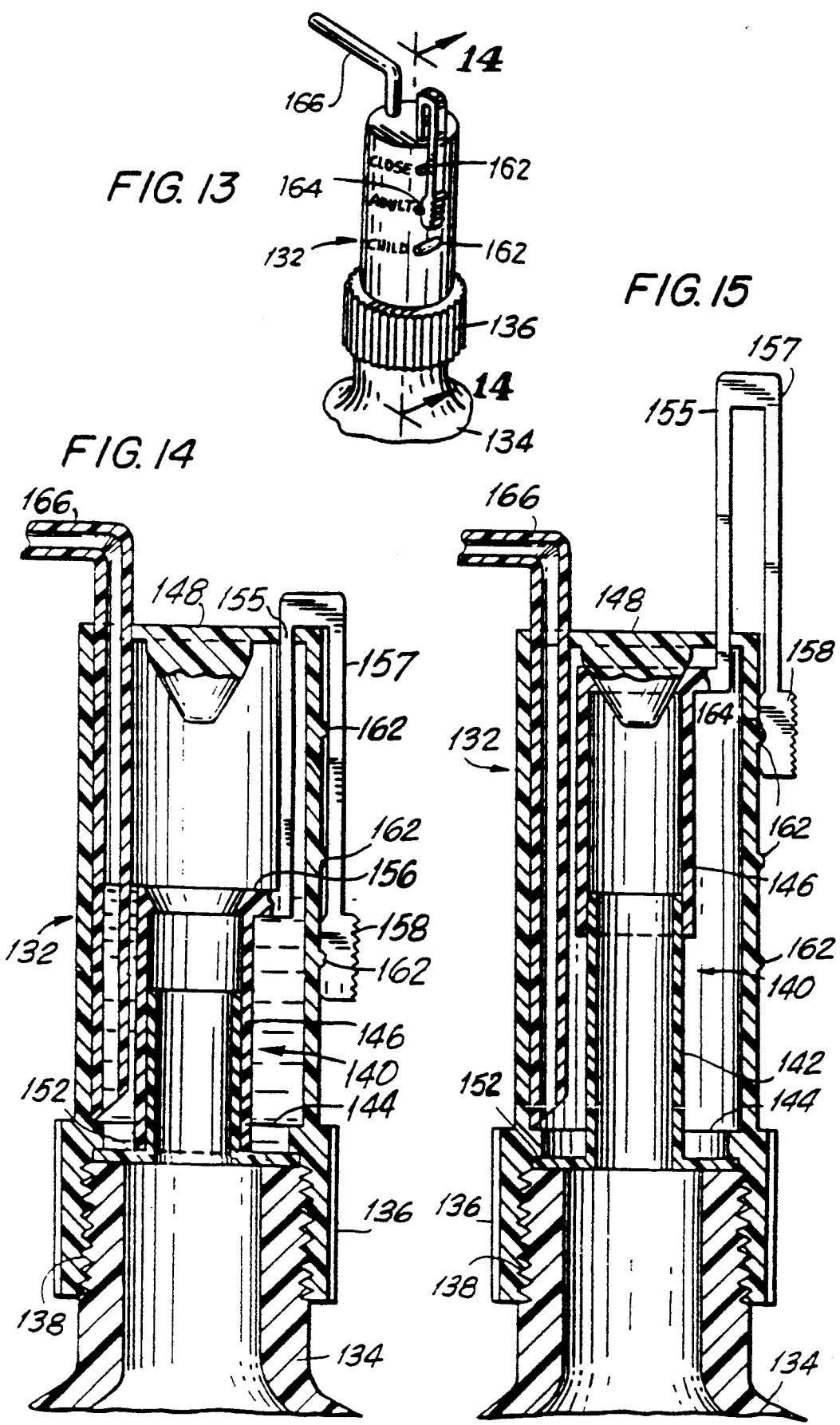

DEVICE FOR THE CONTROLLED MEASURING AND DISPENSING OF A FLUID

CROSS REFERENCE TO RELATED APPLICATIONS

This is a divisional of application Ser. No. 07/991,140 filed Dec. 16, 1992, now U. S. Pat. No. 5,259,140, which is a continuation-in-part of copending application Ser. No. 07/821,798, filed Jan. 16, 1992, now U.S. Pat. No. 5,174,478, which is a divisional of application Ser. No. 07/640,527, filed Jan. 10, 1991, now U.S. Pat. No. 5,119,971, which is a continuation of application Ser. No. 07/410,157, filed Sep. 20, 1989, now abandoned, which is a continuation-in-part of application Ser. No. 07/117,356, filed Oct. 27, 1987, now abandoned, which is a continuation-in-part of application Ser. No. 06/827,781, filed Feb. 7, 1986, now abandoned.

FIELD OF THE INVENTION

The present invention relates to apparatus for dispensing quantities of fluid from a container, and in particular to apparatus for accurately dispensing measured amounts of a liquid from a closed container of that liquid.

BACKGROUND OF THE INVENTION

There has been a long felt need for a simple, inexpensive and accurate device for dispensing a predetermined amount of fluid directly from a reservoir of that fluid without the need for separate measuring devices such as cups and/or measuring spoons. This need has existed, with varying requirements as to accuracy and service conditions, in such widely varying applications as dispensing of cough syrups, liquid soaps, detergents, antacids, traditional and veterinary medications, as well as the accurate dispensing of fluid components for various formula in research and development laboratories and hospitals.

A particularly advantageous application of such a device would be in the dispensing of both ethical and over-the-counter liquid medications. Although the dispensing of such medications does not, in many cases, require an analytical degree of accuracy and reproducibility, the usual approach of "teaspoon measurement" leaves much to be desired. For example, due to the many varied designs and capacities of teaspoons, a "one teaspoon" measurement could vary from 4 to 7.5 ml. In addition, an appreciable error can be introduced in the measuring process by the individual making the measurement; for example, an individual may habitually undercut the measurement to avoid spillage, whereas another individual may actually take a "heaping teaspoonful" in order to ensure good measure. It follows that, as the number of teaspoons required for the desired dosage increases, this margin of error is compounded. With regard to tablespoon measurement an even wider variance is encountered, and the actual quantity of medication administered could be anywhere from 12 to 24 ml. depending on the particular spoon used and the individual measuring the dosage. Also, when the particular medication is to be mixed with water or other liquid, the separate measuring device not only represents a possible source of inaccurate measurement but also a serious source of possible bacterial or viral contamination.

Another use of such a device would be in measuring and administering medication to individuals suffering from handicaps, neuromuscular disorders or debilitating diseases such as, for example, multiple sclerosis, Parkinson's disease, blindness or other condition where dispensing and/or administering the liquid medication utilizing a spoon or cup would be difficult or impossible. Currently, when the individual for whom medication is prescribed is, for instance, blind or has poor eyesight he must rely on supervisory personnel to dispense an accurate dosage. In the alternative, he can use a "braille" cup having raised annular rings formed in the sidewalls thereof to indicate the various dosages. Measurement using this device is accomplished by placing a finger within the cup at the appropriate ring representing the correct dosage and pouring the medication into the cup the fluid level reaches the finger. The drawbacks of these methods are readily apparent. Full or part-time supervisory personnel are becoming increasingly expensive and the "braille" cup method is prone to potentially life-threatening inaccuracies.

In the field of veterinary medicine, there has also been a long felt need for measuring and dispensing apparatus capable of accurately and efficiently administering fluid medication to animals. To date this procedure has been accomplished through the use of tubes and eyedroppers wherein the veterinarian or owner would draw the correct dosage into the eyedropper or tube, insert the spout into the animal's mouth and expel the fluid. This method generates problems in that, should the animal fail to swallow the medication, a second application would be required. Further, repeated contact between the animal's mouth and the eyedropper, and then the eyedropper and the reservoir of medication, results in potentially dangerous contamination to the medication remaining in the reservoir.

Many devices have been proposed for the dispensing of controlled-volume increments of fluids from containers, but all have suffered from one or more of a number of disadvantages. For example, many of the proposed devices which operates by means of pressurizing the container holding the fluid have been prone to inaccuracy and erratic operation brought about by pressure differences between the ambient atmosphere and the vapor space over the fluid inside the device. Designs of this type tend to create a partial vacuum inside the container caused either by fluctuations in the ambient temperature and pressure or by altitude differences between the point where the dispenser is first joined to the container and the point of use. The partial vacuum could also be created by repeated withdrawals of fluid from the device without replacing the volume thus lost with an equivalent volume of air. This pressure differential tends to impede the flow of fluid out of the dispenser, resulting in dispensing of inaccurate dosages. By the same logic, an excess pressure in the apparatus will tend to promote an undesirably large outflow of the fluid causing an overdose or spillage.

This difficulty does not arise when the container is opened to the atmosphere to dispense a measured dosage with each one. However, when the container itself is opened directly to the atmosphere there is the attendant danger of spillage and/or contamination.

Devices which do not require opening for each use generally effect pressure equalization by allowing air to bubble into the reservoir of liquid medication simultaneously with the withdrawal of liquid therefrom. Heretofore this method required that the dispenser construction be rather complex to allow for the measured dispensing of the liquid and simultaneous pressure equalization. Some of these devices even made use of differential air pressure to control the flow of liquid and thereby cut off the flow at a desired volume. Such devices, however, require sophistication and expensive mechanical construction.

While the foregoing description of the background of the invention has been directed primarily in terms of measuring and dispensing of medication, it will be recognized that the same considerations apply, with varying degrees of emphasis, to a wide variety of other applications.

OBJECTS AND STATEMENT OF THE INVENTION

It is therefore an object of the present invention to provide an improved means for measuring and dispensing predetermined quantities of fluid from a reservoir of that fluid.

Another object is to provide measuring and dispensing apparatus having improved accuracy and reproducibility with respect to the volume dispensed.

Still another object is to provide a measuring and dispensing means which is capable of adjustment in a simple and convenient manner, to dispense a preselected and variable volume of fluid.

A further object of the present invention is to provide means for measuring and dispensing predetermined quantities of liquid from am attached reservoir without the necessity for separate measuring devices.

Another object of the present invention is to provide a measuring means for a liquid wherein a surplus quantity of the liquid fed into the measuring chamber will be returned into the container thereby insuring an accurate and consistent measurement.

A particularly desirable object of the present invention is to provide a measuring and dispensing means in which the foregoing objects are provided by the use of a simple, inexpensive apparatus.

The present invention provides a unique and novel solution to the problem of accurately measuring and dispensing predetermined amounts of a liquid material from conventional flexible-wall containers. The invention comprises a device for dispensing a measured quantity of fluid from a supply of said fluid, the device including a container having at least one flexible wall and means for providing a measured amount of fluid for discharge from the device. This means is further adapted to fit the container and is provided with a chamber adapted to hold the measured amount of fluid to be dispensed. The device is also equipped with a means for conducting the fluid from the container to the chamber when the device is inverted and for conducting when the device is righted, the amount of fluid in said chamber which is in excess of the measured amount back to the reservoir. This means for conducting the fluid preferably extends from the base of the chamber to about one-half the height of that chamber. This design feature permits the chamber to consistently retain and dispense correct measured dosages. This is because when the chamber is inverted, the chamber fills up until it reaches the top of the conduit. When the chamber is righted, a quantity of fluid must be present in the chamber which exceeds the height of the conduit thus permitting some overflow back into the reservoir.

If the conduit is too high, only a small portion of the fluid enters the chamber. When the chamber is righted, the fluid level may be below the top of the conduit thus preventing the chamber from returning a consistent accurate measure.

The volume of the conduit structure itself also must be taken into account since it displaces fluid when the chamber is righted. The device is also provided with means for discharging the measured amount of fluid held in the chamber, this means including a conduit from a location within the chamber and proximate its base such that the fluid is discharged in response to a force exerted on the flexible wall of the container. Advantageously, the container will be formed from a resilient material such as is commonly employed to form so-called "squeeze bottles". The measuring means can be constructed of a clear or translucent glass or plastic and is provided with a connection between the measuring means and the container. Where desirable, the measuring means may be incorporated into the top of the container to prevent access to or contamination of the liquid in the reservoir.

Basically, the measuring means includes a dispensing means and comprises an integral unit preferably of rigid translucent plastic or glass. The measuring means is provided with a measuring chamber for receiving, measuring and maintaining the fluid to be dispensed. The walls of the chamber can be provided with annular rings or other markings thereon to indicate the desired dosage visually.

In operation, the container-measuring means combination is inverted allowing the fluid to enter the measuring chamber by means of a passage between the chamber and the fluid reservoir. The fluid is allowed to fill the chamber and, when the container is righted, excess fluid is automatically permitted to flow back into the reservoir leaving a predetermined dosage of the fluid within the chamber to be dispensed at will by the user.

The dispensing means, advantageously in the form of a long tube which extends from within the measuring chamber (typically from a location proximate the chamber's base) to some point outside the chamber, acts as a conduit for the measured fluid. Dispensing is accomplished by squeezing a flexible side-wall of the container thereby to increase the pressure within the measuring chamber and force the measured portion of the fluid in the chamber through the dispensing tube into an appropriate receptacle or other desired location. The dispensing tube can also be provided with a flexible joint to allow the dispensed fluid to be more easily directed into a glass, or where desirable, directly into the mouth of the patient. This feature obviates the need for any other measuring device such as a spoon or glass and thus avoids inaccurate measurements and spillage.

A closure of valve can be positioned within the dispensing tube to seal the reservoir and measuring chamber and prevent accidental spillage of any fluid therein. Where the device is to be used to dispense liquids to several different persons the dispensing tube may also be provided with disposable tips or sheaths to prevent contamination and/or the spread of disease.

Where the invention is to be used for fluids that are sugar-based or are particularly sticky, the chamber can be designed to be stored in the inverted position thus keeping the chamber full of fluid at all times. This prevents gumming up of the dispenser caused by drying up of the fluid in the chamber between uses.

A further refinement of this invention is the provision of means within the measuring chamber for varying the amount of liquid retained in the chamber once it is inverted and righted in sequence. This is accomplished, for example, by providing means for varying the height of the fluid retained within the measuring chamber and/or by varying the capacity of the measuring chamber to allow for different quantities of liquid to be retained within the measuring chamber.

BRIEF DESCRIPTION OF THE DRAWINGS

The above and other objects, features and advantages of this invention will be apparent in the following detailed description of illustrative embodiments, especially when taken in conjunction with the accompanying drawings wherein:

FIG. 7 is a perspective view, in section, of another embodiment of the invention providing a single predetermined dosage;

FIG. 8 is a side elevational view, in cross-section, taken along line 8—8 of FIG. 7;

FIG. 9 is a horizontal cross-sectional view, taken along line 9—9 of FIG. 8 showing the single dosage embodiment of FIG. 7;

FIG. 10 is a perspective view, in section, of a variable dose embodiment of the invention;

FIG. 11 is a side elevational view in cross-section, taken along line 11—11 of FIG. 10 showing the slide and tube position for the adult dose in the embodiment of FIG. 10;

FIG. 12 is a side elevational view, in cross-section, showing the slide and tube position for closure of the chamber in the embodiment of FIG. 10;

FIG. 13 is a perspective view, in section, of another variable dose embodiment of the invention;

FIG. 14 is a side elevational view, in cross-section, , taken along line 14—14 of FIG. 13, with the slide and tube in the adult dose position; and FIG. 15 is a side elevational view, in cross-section, of the slide and tube of FIG. 14 in the closed position.

DETAILED DESCRIPTION OF PREFERRED EMBODIMENTS

Figure 2:
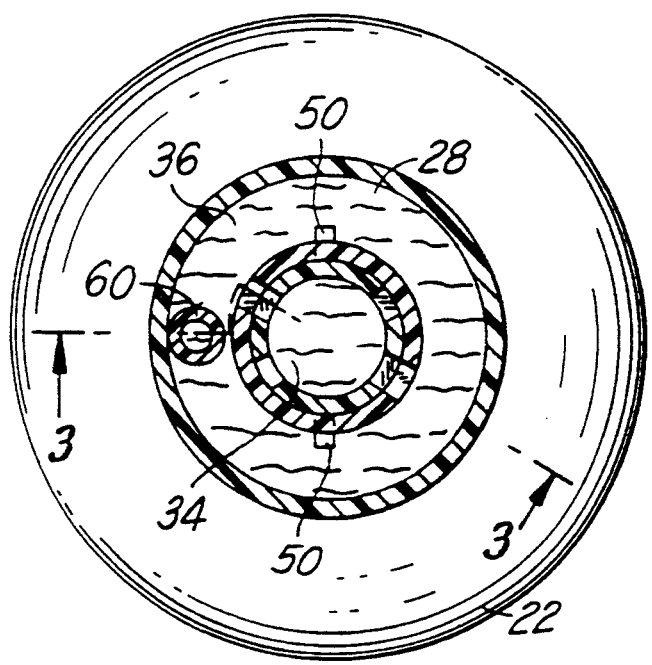
FIG. 2 is a horizontal cross-sectional view, taken along line 2—2 of FIG. 1, of the measuring chamber shown in FIG.
Figure 1:
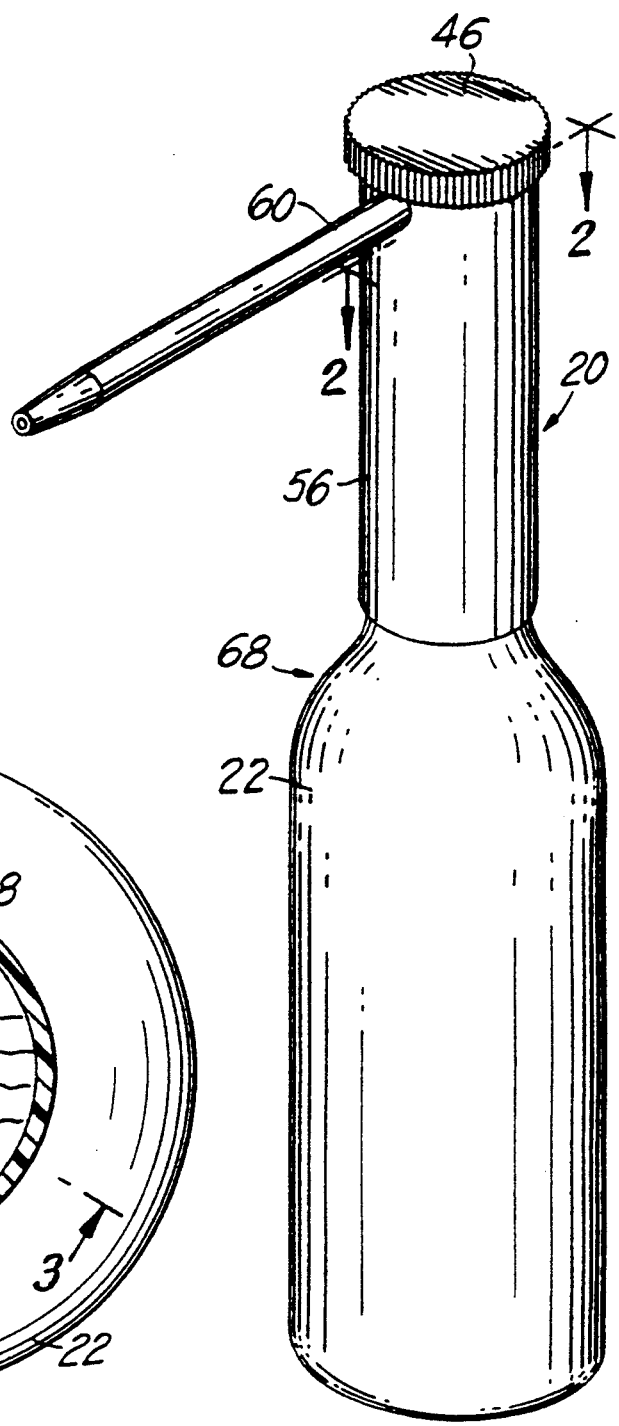
FIG. 1 is a perspective view of showing one embodiment of the invention with the variable dose measuring chamber attached to a conventional squeeze bottle.
Figure 3:
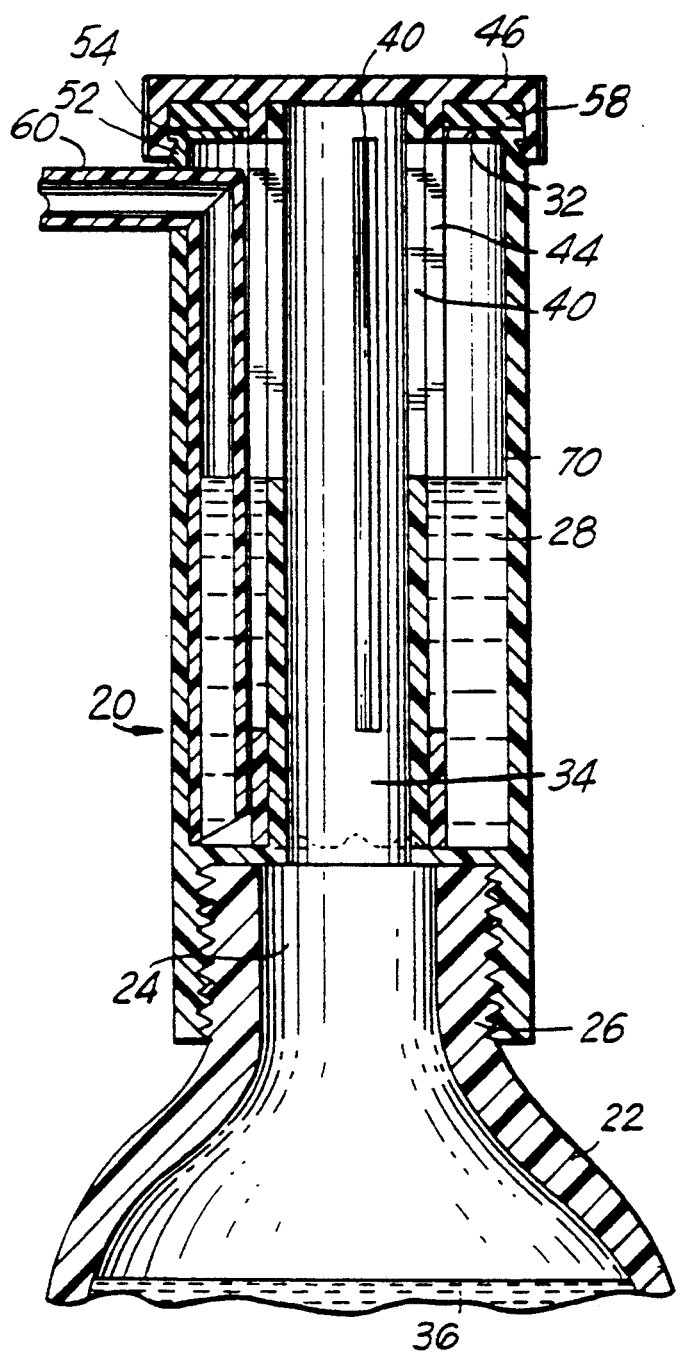
FIG. 3 is a side elevational view, in cross-section, taken along line 3—3 of FIG. 2, of the measuring chamber and squeeze bottle shown in FIG. 1.
Figure 4:
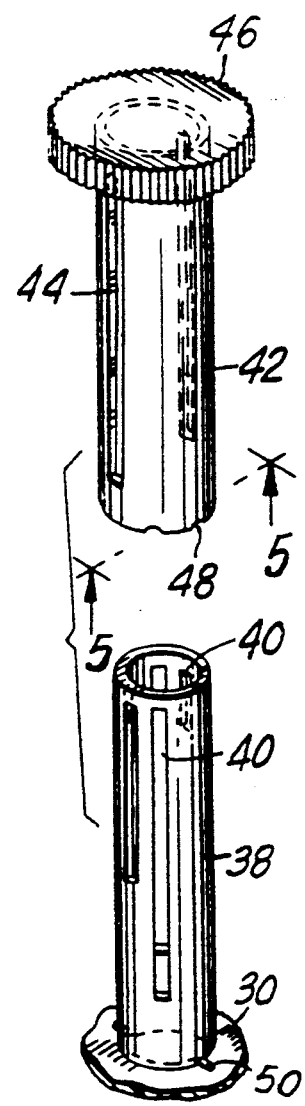
FIG. 4 is an exploded view, in perspective, of one embodiment of the inlet tubes of the measuring chamber.
Figure 5:
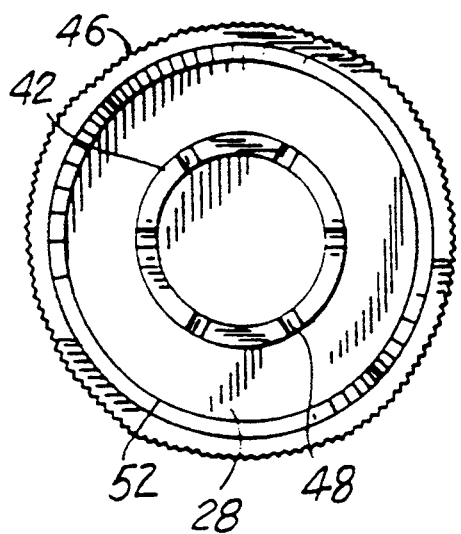
FIG. 5 is a horizontal cross-sectional view, taken along line 5—5 FIG. 4, of the outer inlet tube.

Referring now to the drawings, and in particular to FIGS. 1-6, there is depicted an apparatus in accordance with one embodiment of the present invention. The apparatus, denoted generally at 20, is mounted on the top of a conventional flexible-wall container 22 which container includes a mouth 24 having threads 26 provided circumferentially thereabout (see FIG. 3). Other forms of connection between the apparatus 20 and the container 22 are also suitable as circumstances dictate—e.g., a frictional insertion of the bottom of the apparatus into the top of a bottle in place of a cork or plastic stopper.

Enclosed within the apparatus 20 is a dosage measuring chamber 28 of cylindrical construction having a base portion 30 and a top portion 32. A passage 34 is formed in the base portion of the chamber 28 to permit fluid 36 contained within the flexible-wall container 22 to pass between the dosage measuring chamber 28 and the flexible wall container 22. In this embodiment of the invention, this passage 34 opens into an inner tube which is open at its distal and proximal ends. This inner tube 38 is provided with a plurality of vertical slots 40 of varying lengths (best shown in FIG. 4). The inner tube 38 is fixed to the base portion 30 of the dosage measuring chamber 28. An outer tube 42 is rotatably imposed over the inner tube 38 and adapted for movement between multiple positions. The outer tube 42 is provided with a plurality of vertical slots 44 which are at least of the same length as the longest slot in the inner tube 38. Preferably, these slots are positioned so that the top of the uppermost slot is located about half the height of the inner tube 38. In this embodiment of the present invention the outer tube 42 is also provided with a knurled knob 46 fixed to the upper end of the outer tube 42 to facilitate rotation of the outer tube.

The lower end of the outer tube has a series of notches i 48 which engage protrusions 50 formed in the base portion 30 of the dosage measuring chamber 28. These notches 48 are positioned to engage protrusions 50 at points of alignment between vertical slots 40 in the inner tube 38 and vertical slots 44 in the outer tube 42. Optionally, notches 48 may be provided to engage protrusions 50 at points where the vertical slots 44 in the outer tube 42 do not align with the variable length vertical slots 40 in the inner tube, thus effectively sealing the dosage measuring chamber 28 from the fluid reservoir in the flexible wall container 22.

In this embodiment of the invention, sealing of the top of the dosage measuring chamber 28 is accomplished by providing knob 46 with an internal peripheral lip 52 which sealably engages a concentric notch 54 in the upper wall 56 of the dosage measuring chamber 28. This sealing may be further supplemented by interposing a seal 58 between the knob 46 and the top portion 32 of the dosage measuring chamber 28.

A discharge tube 60 is positioned within the dosage measuring chamber to provide a suitable conduit for the measured fluid 62 to be expelled from the dosage measuring chamber 28° The lower end 64 of the discharge tube 60 is advantageously provided with an angled opening 66 positioned in contact with or in close proximity to the base portion 30 of the dosage measuring chamber 28. This arrangement facilitates complete expulsion of the measured fluid through the exit tube and avoids the accumulation of excess fluid in the base of the chamber after dispensing is complete.

To measure a dosage of medication using the apparatus according to this embodiment of the invention, the knob 46 is first rotated until the vertical slots 44 in the outer tube 42 align with the appropriate vertical slots 40 in the inner tube 34 representing the desired dosage. This alignment may be accomplished by means of appropriate markings placed on the walls of the dosage measuring chamber and/or by forming the side walls 56 of the dosage measuring chamber 28 of a transparent or translucent material which permits visual confirmation of the appropriate alignment. Once slots 44 and 40 have been aligned, the chamber-container assembly, indicated generally at 68, is inverted permitting the fluid 36 contained in the reservoir to flow through passage 34 and aligned slots 40, 44 and fill the dosage measuring chamber 28. Subsequently, the assembly 68 is restored to its original upright position causing excess fluid in the dosage measuring chamber to drain back into the reservoir until the level of fluid 62 within the chamber reaches the bottom edge 70 of the inner slot 40. It is readily apparent to one skilled in the art that by varying the height of bottom edge 70 relative to the base portion 30 and/or by increasing the diameter of the chamber wall 56, a variable dosage may be maintained within the dosage measuring chamber 28.

After the assembly 68 is restored to its original upright position and the excess fluid has drained back into the reservoir 36, the liquid representing the desired dosage is maintained within the dosage measuring chamber 28 to await dispensing by the user. This dispensing is accomplished by compressing a flexible wall of container 22 thus creating a pressure differential between the fluid within the assembly 68 and the ambient environment. This pressure differential causes the expulsion of the measured fluid 62 through discharge tube the discharging fluid can be directed as desired.

In certain embodiments of the invention, such as that depicted, the fluid contained within the reservoir may be sealed from the ambient conditions by rotating the outer tube 42 so that the vertical slots 44 are not aligned with any of the vertical slots in the inner tube 34. In this manner, the assembly may be stored or shipped in any attitude without the fear of leakage or contamination.

Figure 19:
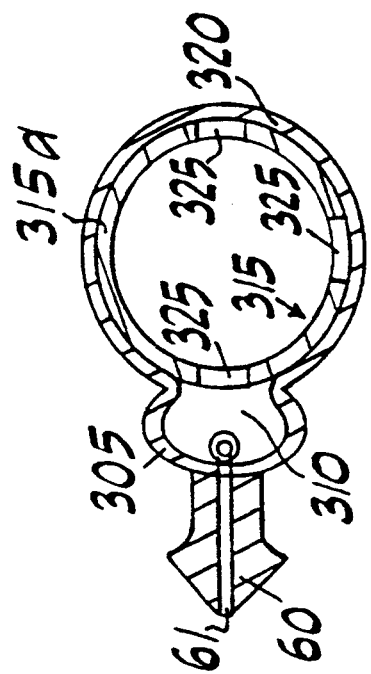
FIG. 19 is a top view through line 19—19 of FIG. 18.
Figure 18:
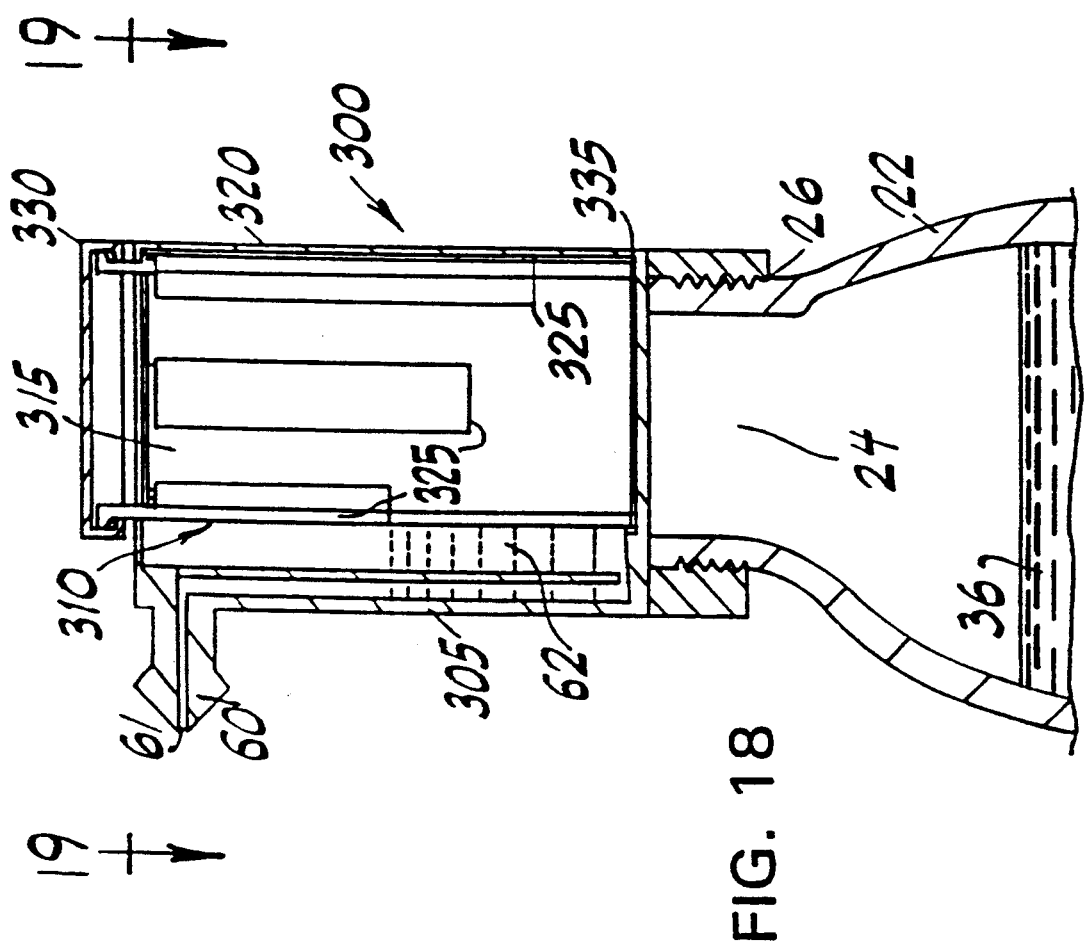
FIG. 18 is horizontal cross-sectional view of another variable dose embodiment of a measuring chamber according to the invention.

FIGS. 18 and 19 illustrate a variation of the variable dosage embodiment depicted in FIGS. 1-6. Here, the apparatus, generally designated by 300, includes an outer housing portion 320 and an integral, oval shaped or rounded measuring chamber 305. As illustrated, the measuring chamber 305 is connected to the housing portion 320 by an opening 310 running substantially the vertical length of chamber 305. As with the previous embodiment, a discharge conduit 60 having a through orifice 61 is provided to discharge the measured fluid 62 collected in measuring chamber 305.

A single rotatable tube 315 is provided to measure out variable dosages of the medication. The rotatable tube 315 is rotatably secured within the outer housing portion 320 and it is configured to be slidably flush with the inside surface of the housing portion. Similar to inner tube 38 of the previous embodiment, a plurality of vertical slots 325 are formed in rotatable tube 315. Preferably, as before, the lengths of these slots are varied in order to obtain differing measures of dosages. The width of each vertical opening 325 is chosen to be somewhat narrower than the width of opening 310. A knob 330 is provided for rotating the tube 315, and as in the prior embodiment, notches and protrusions (not shown) may be formed at the interface 335 between the bottom of tube 315 and the bottom inside surface of outer housing 320 to align the vertical tube openings 325 with the opening 310.

In operation, a user may align one of the tube openings 325, conforming to the desired medication dosage, with the chamber opening 310. Because the vertical opening 325 is narrower than the opening 310 of the measuring chamber 305, liquid-tight seal is formed between tube 315 and chamber 305 to prevent leakage of measured fluid 62 back into the device 300. The container 22 is inverted so that liquid from reservoir 36 will travel through tube 315, out the vertical opening 325 and through opening 310 to fill measuring chamber 305. When righted, any fluid remaining in chamber 305 above the bottom of vertical opening 325 will flow back into container 22, leaving measured dosage 62 within the measuring chamber 305. The measured dosage can then be administered to the patient through conduit 60 as previously described. Advantageously, during transport, the tube 315 can be rotated so that a solid wall portion 315a, configured to be wider than the measuring chamber opening 310, blocks off the opening 310 to seal the apparatus and prevent accidental spillage of the liquid.

FIGS. 7-9 show a simplified embodiment of the present invention capable of measuring and dispensing a single predetermined dosage from a reservoir of fluid contained in a flexible-walled container. In this embodiment a simplified dosage measuring chamber is utilized (indicated generally at 70) which is mounted on the top of a conventional flexible-walled container 72. The attachment means between the chamber and the container 72 may be a threaded connection 74 as shown or any other type of engagement which provides an acceptable seal between the chamber and the container.

The chamber 70 is provided with an internally threaded lower portion 76 optionally provided with a plurality of vertical ridges in the external periphery thereof to aid in the removal of the chamber. Communication between the reservoir of fluid 78 in the flexible-wall container 72 and the chamber 70 is provided by an open-ended tube 80 of fixed length which extends through the base portion 82 of the flexible-wall container 72 into the chamber 70 for a predetermined distance. Preferably, this predetermined distance is about one-half of the height of chamber 70. Sealing between the open-ended fixed length tube 80 and the container is provided by an annular shoulder 84 formed in the lower end of tube 80 which sealably abuts against the top lip 86 of the flexible walled container 72 when the threaded engagement 74 is properly tightened.

A discharge tube 88 is positioned within the dosage measuring chamber 70 to provide a conduit for the measured dosage of the liquid 90 to a point outside the chamber. This tube 88 is optionally provided with an angled end 92 positioned in close proximity to the base portion 82 and extends to a point outside the dosage measuring chamber. In the embodiment shown in FIGS. 7–9 this tube 88 is angled at 94 to more easily direct the measured dosage to the desired location. Optionally, base portion 82 can be sloped downward toward end 92 to ensure complete evacuation of the fluid in chamber 70. A valving means 93 may be positioned in a convenient location in the exit tube to seal the dosage measuring chamber 70 from ambient conditions. This may be desirable to avoid spillage or contamination.

To measure out a dosage of fluid utilizing this embodiment of the present invention, the valving means 94 is opened to vent the chamber and the chamber-container assembly 96 is inverted to permit fluid in the reservoir 78 to pass through the open-ended fixed length tube 80 and fill the dosage measuring chamber 70. Once this is accomplished, the assembly 96 is returned to its original upright position permitting any excess fluid located in the chamber 98 above the top edge 100 of the fixed length tube 80 to drain back into the container 72. Where the fluid to be dispensed is particularly viscous or where inlet tube 80 is narrow, a surface tension relieving means such as pin 101 can be formed adjacent the top edge 100 of the tube 80 to break the surface tension and to initiate flow of the excess fluid back into the reservoir 78. The fluid remaining in the dosage measuring chamber 70 represents an accurate predetermined dosage 90 of the fluid.

In order to dispense the fluid within the chamber 70, pressure is applied to the flexible-walled container 72 creating a pressure differential between the inside of the chamber-container assembly 96 and the ambient conditions. As in previously described embodiments, this pressure differential forces the measured fluid 90 out of the chamber and through discharge tube 88. In both embodiments heretofore discussed pressure must be continuously applied to the flexible-walled container until the liquid contained in the dosage measuring chamber is totally expelled. After dispensing is complete the chamber of the embodiment shown in FIGS. 7–9 may be sealed by moving valving means 93 to a closed position.

Further embodiments of the present invention are shown in FIGS. 11–15. These embodiments show alternative means for measuring and dispensing variable doses of a fluid from a reservoir of that fluid maintained in a flexible-walled container.

Referring now to FIGS. 10–12, a variable dosage measuring chamber, indicated generally at 102, is provided with an internally threaded lower portion 104 which engages external threads 106 formed in the upper potion of flexible-walled container 108. It would be readily apparent to one skilled n the art that this securement between the chamber 102 and the container 108 may be accomplished by any other appropriate engagement method. Communication between the mouth 110 of the container 108 is provided by means of a flexible accordion tube 112 which extends into the measuring chamber 102. Preferably, tube 112 extends to about one-half the height of chamber 102 for dispensing its maximum dosage. Sealing between the measuring chamber 102 and the container 108 is accomplished by an annular shoulder 111 in the lower end of tube 112, which shoulder sealably abuts the top lip 115 of the container when the threaded engagement 104 is properly tightened.

Tube 112 is alternately elongated or compressed by means of an inverted U-shaped member 114 which connects the upper lip 116 to slide member 118. The upper lip 116 of the flexible accordion tube 112 is flanged so as to sealably engage the frustrum of an abbreviated, inverted cone-shaped plug 120 when the flexible tube is extended to its maximum length as shown in FIG. 12. This plug 120 is fixed in the inside upper portion of the variable dosage measuring chamber 102. Alternatively, sealing of the variable dosage measuring chamber 102 may be accomplished utilizing any other appropriate shapes or configurations wherein the upper end of the flexible accordion tube 112 is closed to the atmosphere.

In this embodiment of the present invention the appropriate dosage is selected by positioning slide member 118 at the appropriate position corresponding to the dosage to be administered. Advantageously, means are provided to maintain the slide member (and the flexible accordion tube attached thereto) at the desired position without moving. This can be accomplished by forming a plurality of vertically situated horizontal protrusions 122 along the periphery of the outside wall of the dosage measuring chamber adjacent the slide member 118. Slide member 118 is correspondingly provided with a horizontal notch 124 which frictionally engages protrusion 122 and maintains the flexible accordion tube 112 in the desired location. In the embodiment shown in FIGS. 10–12 there are provided three protrusions spaced vertically along the side wall of the variable dosage measuring chamber 102 and are labelled from bottom to top respectively child, adult, and close (FIG. 10). By positioning slide member 118 at the "child" protrusion, the flexible accordion tube 112 is compressed to a predetermined length which would permit a children's dosage to be maintained within the measuring chamber 102 when the combined chamber-container assembly is inverted and restored to its original upright position.

Closure of this embodiment is accomplished by moving slide member 118 to its uppermost position (indicated by the protrusion adjacent the "close" position shown in FIG. 10) which causes the flanged lip 116 to sealably engage the frustrum of the inverted cone-shaped plug 120. In this manner, this embodiment of the apparatus may be sealed from contamination and spillage.

Figure 6:
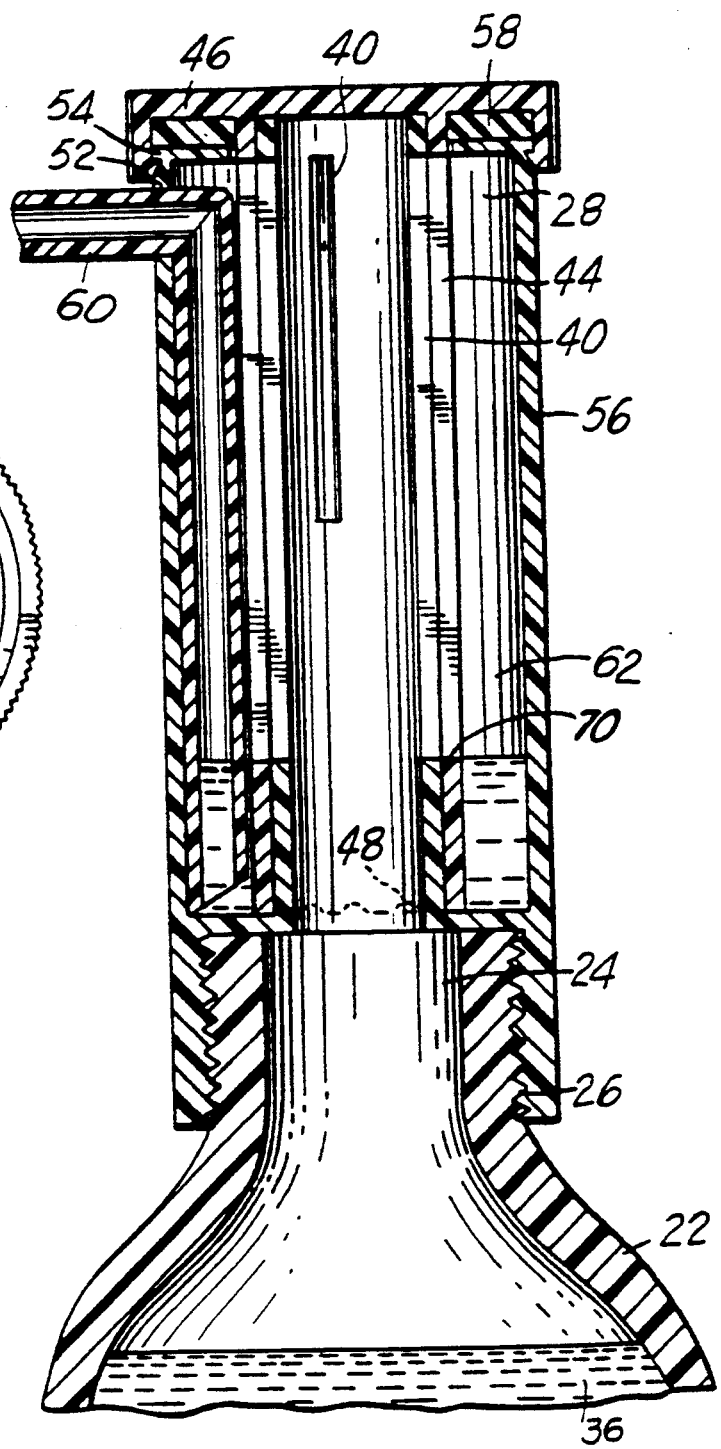
FIG. 6 is a side elevational view, in cross-section, of the variable dose measuring chamber shown in FIG. 3.

Dispensing of a measured dosage of fluid 126 is accomplished in substantially the same manner as described in the previous embodiments. Slide member 118 is positioned for the desired dosage and the chamber-container assembly is inverted to permit fluid contained in the reservoir to pass through the flexible accordion tube 112 and fill the chamber 102. The assembly is then restored to its upright position and any excess fluid above lip 116 of the tube 112 flows back into the reservoir 108 leaving a predetermined dosage within the chamber. Pressure is then applied to the flexible-walled container 108 to create a pressure differential between the inside of the chamber 102 and the ambient conditions thus forcing the measured dosage of fluid 126 contained within the chamber through discharge tube 130. This discharge tube is positioned within the chamber 102 with its 1 lower end in close proximity to the lower portion 131 of the chamber. This lower portion is advantageously angled to facilitate complete dispensing of the fluid. The discharge opening (not shown) is outside the confines of the chamber and may exit out the top of the chamber (FIG. 10) or the side of the chamber (as shown in FIG. 6).

FIGS. 13-15 depict another preferred embodiment similar to that embodiment shown in FIGS. 10-12. A variable dosage measuring chamber 132 is threadably attached to a flexible-walled container 134. Engagement is accomplished by providing an internally threaded lower portion 136 which interlocks with the external threads 138 around the periphery of the mouth of the bottle 134. Communication between the reservoir of fluid in container 134 and the variable dosage measuring chamber 132 is provided by a telescoping tube member 140 made up of an inner tube 142 and an outer tube 146. The inner tube 142 is open on either end and fixed to the base portion 144 of the chamber 132. The outer tube 146 is slidably inserted over inner tube 142 in telescoping relationship. Preferably, outer tube 146 extends to about one-half height of the chamber 132 for dispensing its maximum dosage. The upper portion of outer tube 146 is flanged so as to sealably engage the frustrum of an inverted, abbreviated cone-shaped plug 148 fixed to the top portion 150 of the chamber 132 when the outer tube 146 is fully, vertically extended.

Sealing between the container 134 and the measuring chamber 132 is accomplished by means of a shoulder 152 formed in the lower end of the inner tube 142. As the internally threaded lower portion 136 of the chamber 132 is tightened onto the mouth of the container 134, the top edge of the mouth of the container 134 sealably abuts shoulder 152 creating a leak-proof passage between the container 134 and the chamber 132.

Outer tube 146 is vertically movable by means of an inverted U-shaped member 154 in which one arm 155 extends into the chamber 132 and attaches to the top edge 156 of the outer tube 146. A slide member 158 is attached to the other arm 157 of the inverted U-shaped member 154 and is movable between a plurality of vertical positions to vary the amount of fluid retained within the measuring chamber 132. In this embodiment of the present invention there are provided three positions between which slide 158 may be moved. These positions include a children's dosage (in phantom at 160 of FIG. 14), an adult dosage position shown in solid lines in FIG. 14 and a closed position shown in solid lines in FIG. 15. The slide position is maintained by means of horizontal protrusions 162 aligned vertically along the outer wall of the chamber 132. A horizontal notch 164 is formed in slide member 158 to frictionally engage protrusions 162 and maintain the slide in the desired position.

The measured fluid is expelled from the chamber through a discharge tube 166 which extends from the base portion 144 of the discharge chamber 132 vertically through the upper portion of the chamber for delivery of the measured fluid to the desired location. The bottom edge of tube 166 is preferably angled as shown in FIGS. 14-15 to facilitate accurate and complete discharge of the measured fluid.

FIGS. 23-26 illustrate yet another embodiment of device for varying dosage from the reservoir of fluid 36. The apparatus, generally designated by 500, includes a two-piece housing arrangement threaded or otherwise fit to the bottle 22. As shown, the apparatus includes a base portion 502 which connects the apparatus 500 to bottle 22 via, for example, threads 26. The apparatus 500 further includes an upper housing portion 501 rotatably affixed in a conventional manner to the base portion 502 via grooves or other conventional arrangement (generally designated by 540), for reasons soon to be apparent. The base portion 502, once threaded to the bottle 22, forms a stationary base upon which upper housing portion 501 is free to rotate. If desired, the fluid inlet tube 515 may be formed as an appendage to the base portion 502, with the inlet tube 515 passing through an opening 503 formed in the upper portion 501.

A housing floor 505 is disposed within upper housing portion 501. As shown, the floor 505 is configured to have an inner perimeter 545 slidably flush with the outside surface of inlet tube 515, and an outer perimeter 550 slidably flush with the inside surface of housing 501. The inner and outer perimeters of housing floor 505 thus form a water tight seal with the inlet tube 515/housing 501 to prevent measured fluid from flowing from the measuring chamber back into the reservoir 36.

As in previous embodiments, a discharge tube 60 with an outlet 61 is provided to dispense measured fluid accumulated within the measuring chamber defined in upper housing portion 501. In this embodiment, discharge tube 60 may include, for example, a flexible portion 60a which is securely connected to the chamber floor 505 at a mating point 560. As shown, an opening 530 is formed in the flexible portion 60a substantially adjacent to and flush with the surface of housing floor 505.

Figure 23:
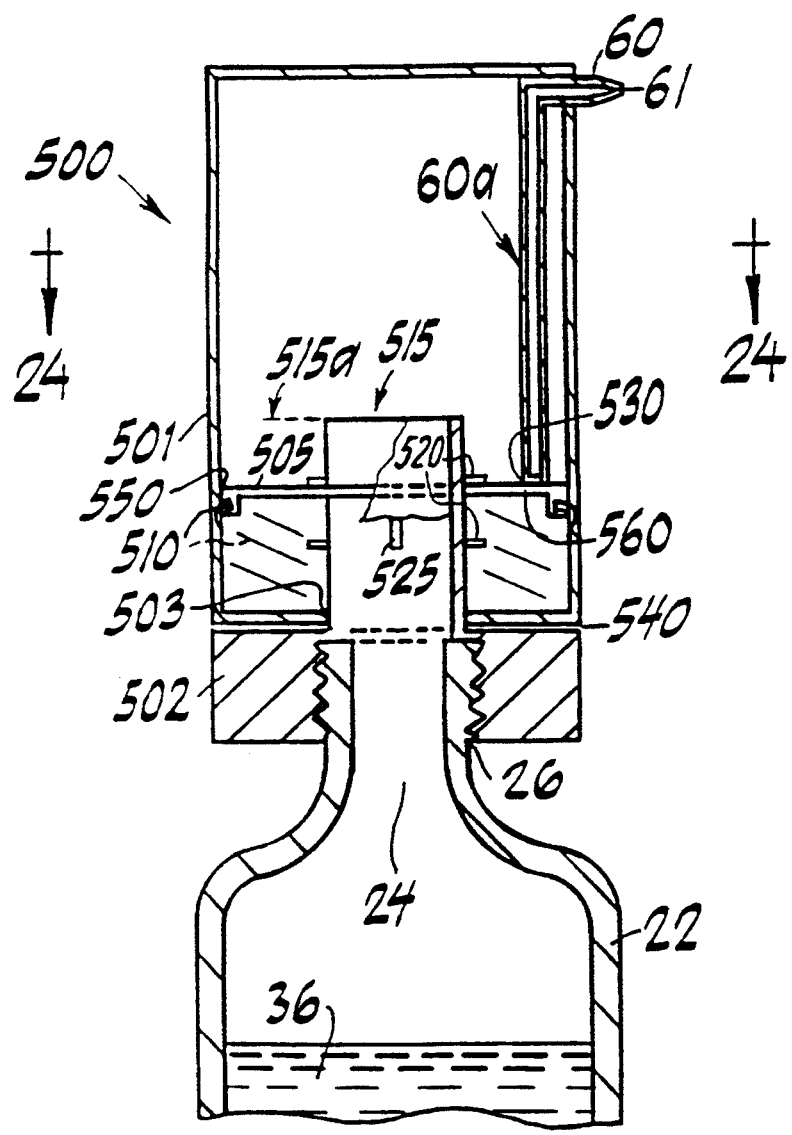
FIG. 23 is a horizontal cross-sectional view of another variable dosage embodiment of a measuring chamber according to the invention.

Advantageously, the relative height of the housing floor 505 within the upper housing 501 may be altered in order to vary the dosage of medication administered to the patient. As shown in FIG. 23, the outer perimeter 550 of the floor 505 is formed to mate with an internal thread 510 formed in the inner surface of upper housing 501. The floor 505 is additionally provided with a female groove 526 which mates with a male groove 525 running vertically along the length of inlet tube 515.

In order to vary the dosage of medication, a user rotates the upper housing chamber 501. By the mating action of groove 510 with the outer perimeter 550 of the floor 505, and depending upon the direction of rotation (clockwise or counter-clockwise) the floor will either rise or fall relative to the top end 515a of the inlet tube 515. The varying height differential between the housing floor 505 and the top end 515a of the inlet tube alters the size of the measuring chamber and, hence, the measured dosage of medication accumulated within housing 501. The male/female groove arrangement 525, 526 will prevent rotation of the floor 505 relative to upper housing 501 to assure that rotational motion of the housing is converted to vertical motion of the floor. While the upper end of discharge tube 60 is firmly secured to the upper housing 501, the flexible tube portion 60a conveniently assures that the discharge tube will not impede free rotation of the upper housing portion 501.

Note that in order to regulate the dosages of fluid dispensed, a pair of upper and lower stop portions 520 may be molded or otherwise provided on the inlet tube 515 to govern the amount of vertical motion (either upwards or downwards) of the floor 505, thereby providing a range of measured dosage according to user need or desire. In addition, it will be apparent to one skilled in the art that notches, protrusions, markings or other means (not shown) might be formed or otherwise provided along the interface formed by upper housing portion 501 and base portion 502 which, correlated to the degree of rotation applied to the upper housing portion 501, would correspond to the relative height of the floor 505 within upper housing 501 and, thus, the desired dosage to be administered.

Figure 26:
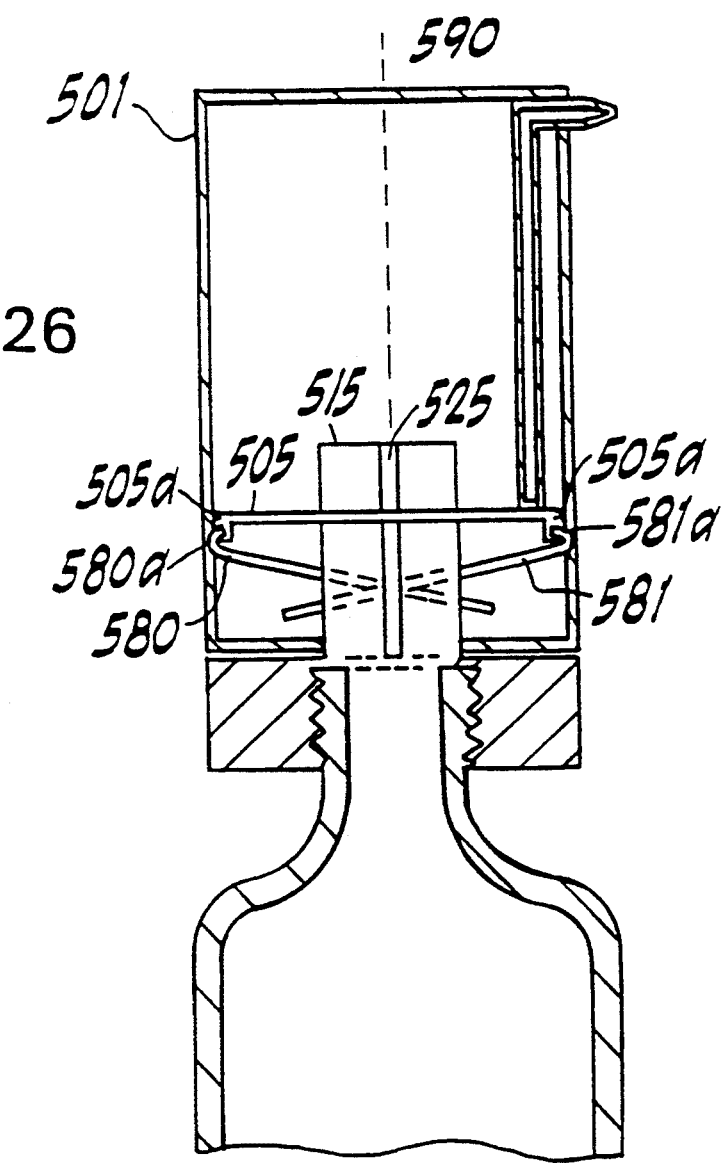
FIG. 26 illustrates a second configuration for implementing mating between the housing floor and the upper housing in the embodiment of FIG. 23.

FIG. 26 illustrates an expedient and cost-effective manner of manufacturing and structuring the mating interface between floor 505 and upper housing 501. Here, a pair of opposed grooves 580, 581 are spirally formed on the inside surface of housing 501. The grooves 580, 581 may be formed to run approximately 90°–180° about the inside circumference of housing 501, the grooves symmetrically oriented with respect to each other both around and along the central axis 590 of the housing 501. The outer perimeter of floor 501 may be fitted with a pair of diametrically opposed notch portions 580a, 581a which are angularly formed and oriented to slidingly travel within their respective mating grooves 580, 581 as the floor is either raised or lowered by the rotation of housing 501. A pair of diametrically opposed, flattened guide portions 505a slide flush with the inner surface of housing 501 to prevent torsional rotation or "twisting" of the floor 505 as it travels within housing 501. Advantageously, this configuration provides a ready way to vary the measured dosage of fluid accumulated within the measuring chamber without subjecting the user to undue rotation of housing 501. The vertical "drop" of the spiral grooves 580, 581 along central axis 590 may be matched to a desired or convenient rotation of housing 501 to achieve a desired vertical travel of floor 505 and, hence, a desired range of measured volumes within the measuring chamber.

Typically, for all the manners for configuring this embodiment, and depending on the physical dimensions of all components, the device may be formed so that an angular rotation of housing 501 of between 90°–180° would suffice to vary the height of the floor 505 by about ¾ to 1 inch, thereby readily accommodating the differing dosages of fluid to be dispensed and accommodating user need or desire. Of course, it will be readily apparent to those skilled in the art that other limitations might be placed on the rotational motion of the upper housing portion 501, or the dimensions of all the components chosen, to enable the device to supply a wide range of dosages.

Figure 25:
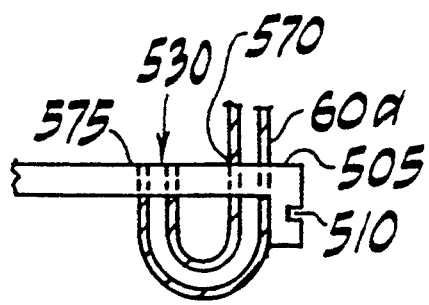
FIG. 25 illustrates a tube connection for the embodiment of FIG. 23.
Figure 24:
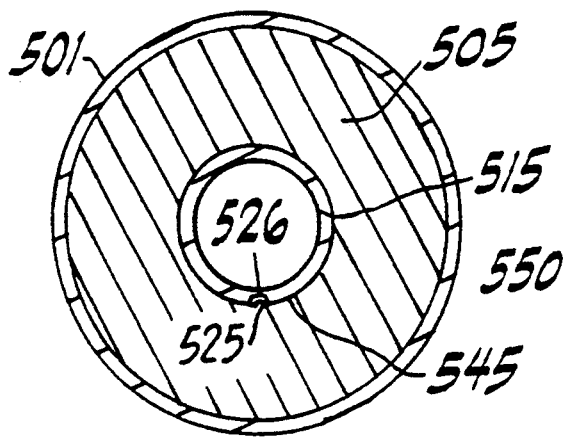
FIG. 24 is a top view taken along line 24—24 of FIG.

FIG. 25 illustrates that flexible tube portion 60a may pass through an orifice 570 formed in the floor 505. The flexible portion may then be wrapped underneath the floor 505 in a "J" configuration to emerge and be affixed through at a second orifice 575 formed in the floor 505. The opening 530 is flush with the bottom of floor 505, providing unimpeded flow of fluid upon discharge.

Other embodiments are also possible for retaining varying amounts of separate fluids. These include varying the overall capacity of either chamber or by incorporating a moveable partition between the measuring chambers to measure out preselected amounts.

Figure 16:
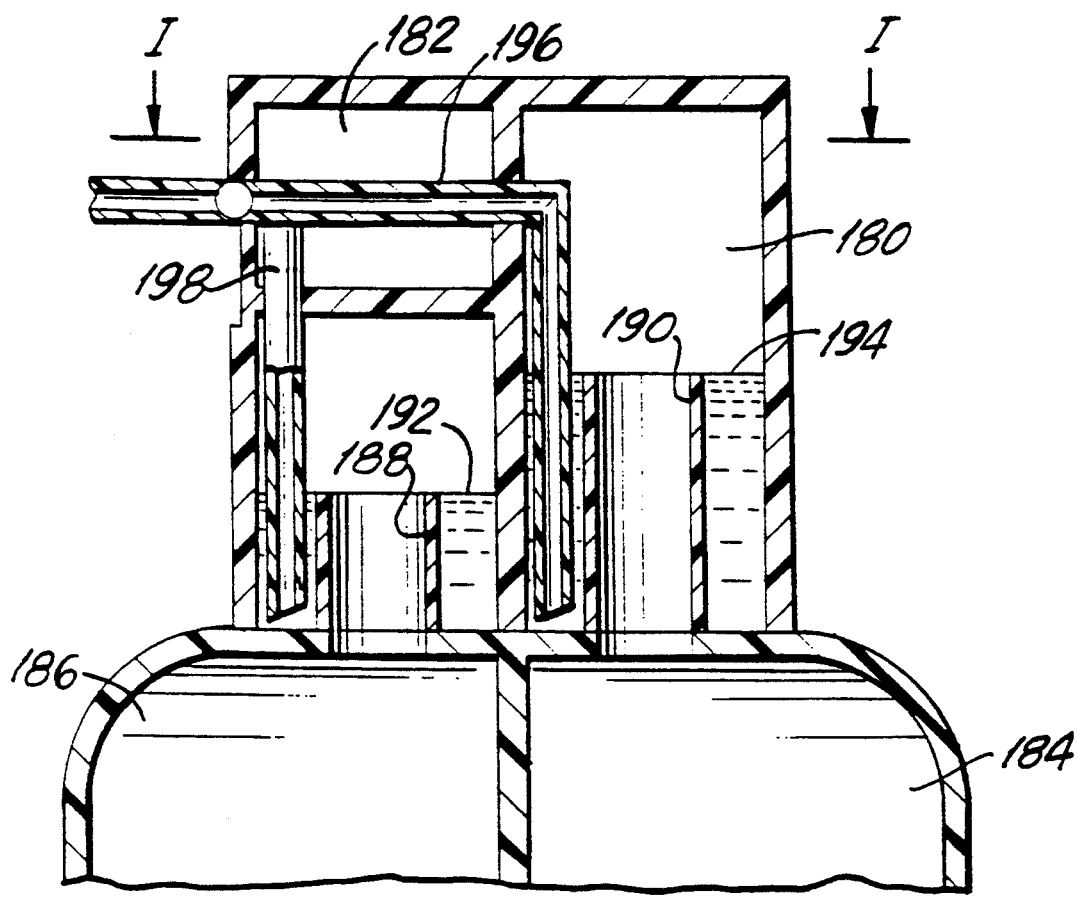
FIG. 16 is a side view of the invention incorporating two independent measuring chambers and reservoirs.
Figure 17:
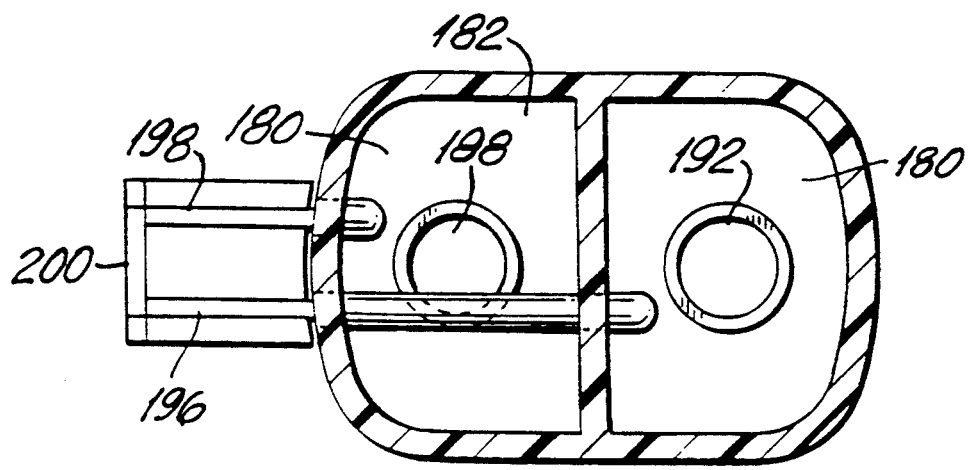
FIG. 17 is a top view through line I—I in FIG. 16 of the invention incorporating two independent measuring chambers and reservoirs.

FIGS. 16 and 17 show an embodiment of the present invention wherein chambers 180 and 182 interconnect with separate reservoirs 184 and 186, respectively, in the same dispenser. In this embodiment chamber 180 and reservoir 184 are separate and independent from chamber 182 and reservoir 186 thus allowing the simultaneous measuring and dispensing of two separate fluids in a single operation. This ability is particularly useful where two reactive fluids are to be mixed prior to use.

Chambers 180 and 182 can be designed to measure either equal or different amounts of fluid. In the embodiment of FIGS. 16 and 17, inlet tubes 188 and 190 extend varying lengths into chambers 182 and 180, respectively, to measure and retain different amounts of fluid 192 and 194 when the dispenser is inverted and righted.

Dispensing is accomplished in the same manner as described in the previous embodiments. Where two reactive fluids are to be mixed outside the chambers, the conduit and venting means 198 and 196 can be brought together in a mixing chamber 200 just prior to expulsion from the conduit and venting means.

Figure 21:
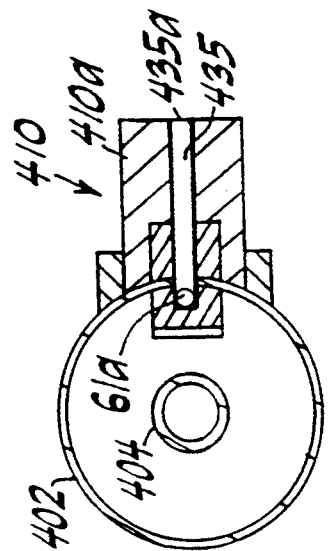
FIG. 21 is a top view taken through line 21—21 of FIG. 20.
Figure 22:
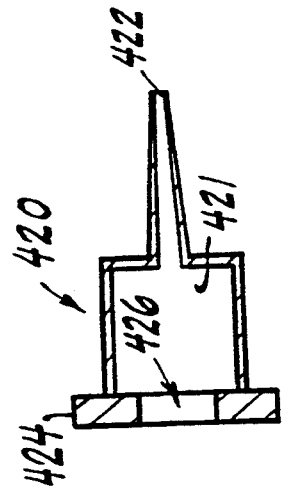
FIG. 22 illustrates a snap-on nozzle for use with the embodiment of FIG. 20.
Figure 20:
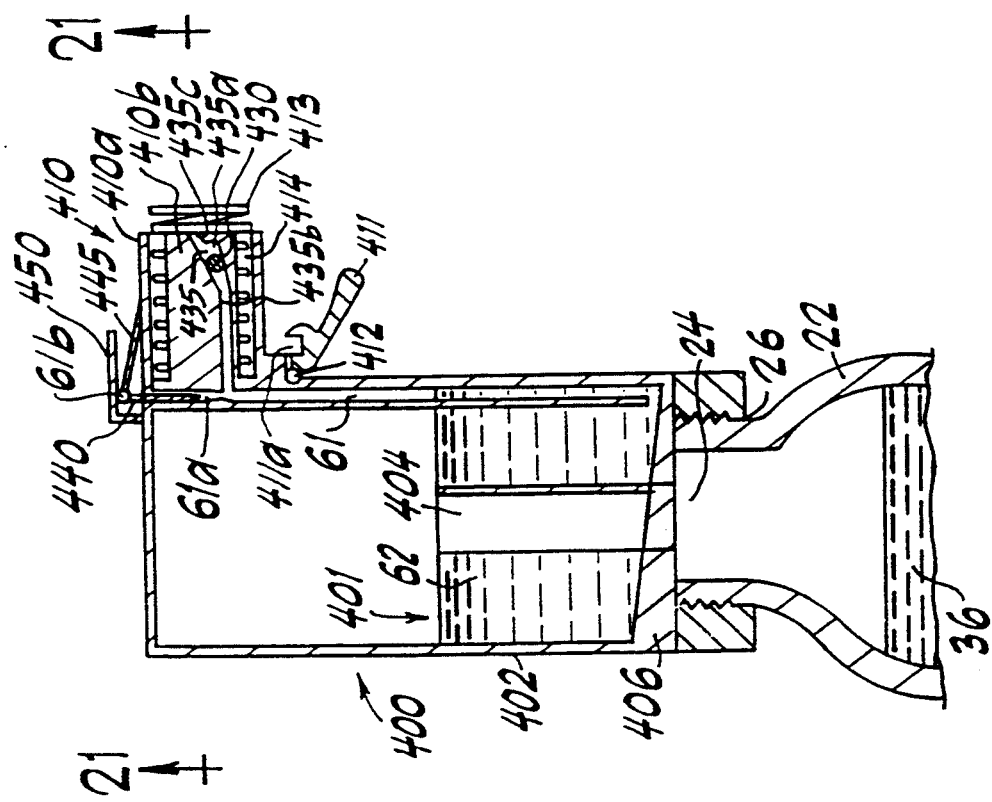
FIG. 20 is a horizontal cross-sectional view of another embodiment of a measuring chamber according to the invention particularly suitable for preventing contamination of liquid still in the container.

FIGS. 20–22 illustrate another embodiment according to the invention, generally designated by 400, that is particularly effective in preventing contamination both of the apparatus and of unused quantities of liquid in reservoir 36. This embodiment is particularly suitable, for example, for use in hospitals, nursing homes, clinics, or the like, where there is a likelihood of the presence of airborne contaminants and bacteria, and where the device will likely be used to administer multiple dosages, either to the same patient or to multiple patients.

The device 400 generally includes a housing 402 defining an interior measuring chamber 401. As before, the device may be mounted to container 22 via threads 26 disposed about the mouth 24 of the container. As before, friction fit on other forms of connection between device 400 and container 22 are also possible.

As also previously described, an inlet tube 404 is provided through base portion 406 of the housing 402 The tube 404 communicates with the interior of container 22 and upon inversion of the container, fluid from reservoir 36 passes through tube 404 to fill a desired dosage 62 within the measuring chamber 401.

Advantageously, device 400 is configured to prevent contamination of fluid remaining in the reservoir 36. A nozzle support 410 is affixed to the exterior of housing 402 for releasably securing a disposable nozzle tip 420. In general, the nozzle support 410 includes an outside housing portion 410a and a central portion 410b. A hollowed chamber 414 is disposed between the outside housing portion 410a and central portion 410b. A coil spring 413 is disposed within hollowed chamber 414 and is secured at one end to the base end of the hollowed chamber. When not compressed, the free end of the spring 413 protrudes out of the chamber 414. The nozzle support 410 also includes a release lever 411 having an engaging notch 411a. The lever 411 is biasingly hinged to the support 410 via a coil spring 412.

The nozzle tip 420 may be formed from any readable material that is easily moldable and moisture impervious (for example, moldable plastics, wax-lined cardboard or the like) and which is economical in manufacture. The nozzle tip 420 may feature a hollowed body portion 421 which fits around housing portion 410a of nozzle support 410, and includes an exit orifice 422. A flattened base portion 424 is provided at the end of body portion 421. The base portion 424 includes a through orifice 426 through which central portion 410b of the nozzle support 410 enters when the nozzle tip 420 is inserted onto nozzle support 410. The nozzle support 410 may also feature an L-shaped top engaging bracket 450 which is spaced from the exterior of housing 410a.

In use, as a user inserts nozzle tip 420 over the nozzle support 410, the flattened base portion 424 engages the free end of spring 413 and compresses the spring. The lever 411 is depressed by the user so that the bottom end of base portion 424 can be engaged within notch 411a. The top end of base portion 424 is secured within and rests in the space between L-shaped bracket 450 and housing 410a. Once the base portion is engaged, the lever is released by the user. The biasing force produced by coil spring 412 ensures that lever 411 will remain in place so that nozzle tip 420 will be securely held to nozzle support 410. Once a dosage is administered, the user need simply press lever 411 to eject the contaminated nozzle tip. The compressive force of spring 413 will urge the contaminated nozzle tip 420 away from the nozzle support for safe disposal and replacement by a fresh nozzle tip. Advantageously, the user need never actually touch the contaminated nozzle tip.

Apparatus is also provided to prevent airborne bacteria from entering the device 400, for example, during administration of a dosage to the patient, and thus contaminating reservoir 36. A so-called ball check valve 430 is disposed in the fluid exit orifice 435 formed in central portion 410b. As shown, the exit orifice 435 is tapered to be wider than the ball valve towards the exit end 435a and narrower than ball valve 430 towards the fluid entry end 435b connected to fluid conduit 61. As shown, the fluid end exit 435a is higher in elevation than the fluid entry end 435b, and a retaining tab 435c may be formed adjacent the exit end 435a, all for reasons which will become readily apparent. A second valve 440, disposed between the L-shaped engaging bracket 450 and nozzle support 410, is biased by a resilient member 445 affixed to outer housing 410a. The second valve 440 is provided to selectively block (or allow) passage of air through an extension tube 61a connected to fluid conduit 61, open to the ambient environment at an opening 61b formed in the exterior of the device.

In operation, as a dosage is being administered, the force of the fluid exiting through exit end 435a pushes the ball check valve towards the wider exit end, ensuring free flow of the fluid. The retaining tab 435c ensures that ball check valve 430 will not be pushed from the exit orifice 435 and out the exit end 435a. Air is prevented from entering through the exit orifice 435 during fluid emission. In addition, owing to the presence of nozzle tip 420 over the nozzle support 410, the top end of the nozzle tip base portion 424 is wedged between engaging bracket 450 and outer housing 410a, thus biasingly pressing the resilient member 445 downward and causing valve 440 to seal off opening 61b at the top of extension tube 61a. Contaminated air is thus prevented from entering the device during administration of the medication.

Immediately after dosage of the medication has ceased, the ball check valve 430 naturally rolls down exit orifice 435 from the elevated fluid exit end 435a towards the lower fluid entry end 435b to block the narrowed entry end, thereby sealing fluid conduit 61 against entry of contaminated air. When the contaminated nozzle tip 420 is then ejected, resilient member 445 will bias the valve 440 upward to open extension tube 61a to ambient air to equalize the pressure between the environment and measuring chamber 401. Upon re-insertion of a fresh nozzle tip 420, the valve 440 will re-seal the extension tube, thus priming the device for another administration of the medication.

Although particular illustrative embodiments of the present invention have been described herein, the present invention is not limited to these embodiments. Various changes, substitutions and modifications may be made thereto by those skilled in the art without departing from the spirit or scope of the invention defined by the appended claims.

I claim:

1. A device for dispensing measured quantities of liquid from a supply of same comprising, in combination:
   a container having at least one flexible wall and a discharge opening;
   a measuring means adapted to fit said discharge opening, said measuring means defining a measureing chamber adapted for dispensing therefrom a measured quantity of liquid held therein;
   a fluid conduit tube disposed in communication with said discharge opening and said measuring chamber for conducting said liquid between said container and said measuring chamber;
   nozzle support means defining a fluid exit orifice and affixed to the exterior of said measuring means;
   a nozzle tip removable affixed to said nozzle support means;
   said measuring means defining a conduit means extending from a location within said measuring chamber and extending to a valve opening formed in the exterior of said measuring means, said conduit means in fluid communication with said fluid exit orifice;
   first valve means located within said fluid exit orifice for selectively sealing said orifice; and
   second valve means adjacent said valve opening for selectively sealing said conduit means.

2. The device of claim 1, wherein said nozzle support means includes rotatably biased lever means for securing said nozzle tip to said support and spring means for ejecting said nozzle tip from said support upon actuation of said lever means.

3. A device for dispensing measured quantities of liquid from a supply of same comprising, in combination:
   a container having at least one flexible wall and a discharge opening;
   a measuring means adapted to fit said discharge opening, said measuring means defining a measuring chamber adapted for dispensing therefrom a measured quantity of liquid held therein;
   a fluid conduit tube disposed in communication with said discharge opening and said measuring chamber for conducting said liquid between said container and said measuring chamber;
   nozzle support means defining a fluid exit orifice and affixed to the exterior of said measuring means for supporting a nozzle tip placed over said nozzle support means, said exit orifice including a fluid exit end and a fluid entry end, said nozzle support means including release means and means for retaining said nozzle tip, said means for retaining cooperating with said release means to eject said nozzle tip from said nozzle support;
   said measuring means defining a conduit extending from a location within said measuring chamber to a valve opening formed in the exterior of said measuring means, said conduit including a branch portion in fluid communication with said fluid exit orifice;
   a ball valve disposed within said fluid exit orifice for selectively sealing said orifice;
   second valve means biasingly affixed adjacent said valve opening for selectively sealing said branch portion; and
   a nozzle tip engaging bracket affixed to the exterior of said device.

4. The device of claim 3, wherein said release means comprises a spring affixed within a chamber defined by said nozzle support and said means for retaining comprises a rotatably biased lever.

5. The device of claim 4, wherein said nozzle tip comprises:
- a housing portion adapted to fit around said nozzle support;
- a base portion engaging said spring to compress said spring upon insertion of said nozzle tip over said nozzle support, said base portion secured by said rotatably biased lever and said engaging bracket, said nozzle tip engaging said second valve means upon insertion of said nozzle tip to bias said second valve to seal branch portion.

6. The device as claimed in claim 3, wherein said fluid exit end is formed wider than said ball valve to permit fluid to exit said device, and said fluid entry end is formed narrower than said ball valve, wherein said fluid exit end is formed at a higher elevation than said fluid entry end to permit said ball valve to roll down said exit orifice upon termination of fluid exit from the device, to seal said exit orifice.

7. A device for dispensing measured quantities of liquid from a supply of same comprising, in combination:
- a container having at least one flexible wall and a discharge opening;
- a measuring means adapted to fit said discharge opening, said measuring means including a base portion affixed to said container and a housing rotatably affixed to said base portion and defining a measuring chamber adapted for dispensing therefrom a measured quantity of liquid held therein;
- a fluid conduit tube having a discharge end and disposed in fluid communication with said discharge opening and said measuring chamber for conducting said liquid between said container and said measuring chamber;
- a movable housing floor disposed within the interior of said housing, said device including means for mating said movable housing floor to said housing to vary the position of said housing floor relative to said fluid conduit tube discharge end upon rotation of said housing portion;
- said measuring means including a conduit means extending from a location within said measuring chamber and extending to an opening formed in the exterior of said housing portion, said conduit means in fluid communication with said measuring chamber.

8. The device of claim 7, wherein said conduit means comprises a tube having a flexible component affixed to said housing floor, said flexible component defining a fluid entry opening substantially adjacent said housing floor.

* * * * *